United States Patent
Swan et al.

(10) Patent No.: US 7,562,934 B2
(45) Date of Patent: Jul. 21, 2009

(54) APPARATUS AND METHOD FOR CONFIGURABLE SEATING

(75) Inventors: David Swan, Aurora (CA); Thomas Heinz-Gerd Preiss, Mehlingen (DE); Robert J. McMillen, Tecumseh (CA)

(73) Assignee: Schukra of North America, Ltd., Lakeshore-Tecumseh (CA)

( * ) Notice: Subject to any disclaimer, the term of this patent is extended or adjusted under 35 U.S.C. 154(b) by 0 days.

(21) Appl. No.: 11/222,054

(22) Filed: Sep. 8, 2005

(65) Prior Publication Data

US 2007/0063560 A1    Mar. 22, 2007

(51) Int. Cl.
*A47C 3/00* (2006.01)
*A47C 7/02* (2006.01)
*A47C 7/14* (2006.01)
*A47C 4/54* (2006.01)

(52) U.S. Cl. .............. 297/284.1; 297/284.3; 297/284.6; 297/284.9; 297/233; 297/452.41

(58) Field of Classification Search .............. 297/219.1, 297/230.1, 230.11, 230.12, 230.13, 230.14, 297/248, 284.3, 284.6, 452.41, 284.1, 284.9, 297/233, 452.23, 452.25, 452.33; 5/654, 5/655.3, 655
See application file for complete search history.

(56) References Cited

U.S. PATENT DOCUMENTS

| | | | | |
|---|---|---|---|---|
| 669,089 A * | 3/1901 | Lambert | | 297/233 |
| 1,063,809 A * | 6/1913 | Lawson | | 297/233 |
| 3,296,635 A * | 1/1967 | O'Hanlan | | 5/654 |
| 3,326,601 A * | 6/1967 | Parkinson et al. | | 297/284.6 |
| 3,330,598 A * | 7/1967 | Whiteside | | 297/284.3 |
| 3,348,880 A | 10/1967 | Swann | | |
| 3,982,786 A * | 9/1976 | Burgin et al. | | 297/284.3 |
| 4,017,118 A * | 4/1977 | Cawley | | 297/284.3 |
| 4,067,078 A * | 1/1978 | Winston | | 5/655.3 |
| 4,143,909 A * | 3/1979 | McFarlin | | 297/284.1 |
| 4,491,364 A * | 1/1985 | Hattori et al. | | 297/284.6 |
| 4,496,189 A * | 1/1985 | Tanizaki et al. | | 297/233 X |
| 4,497,517 A * | 2/1985 | Gmeiner et al. | | 297/284.6 |
| 4,516,568 A * | 5/1985 | Baxter et al. | | 297/230.14 X |
| 4,552,402 A * | 11/1985 | Huber et al. | | 297/284.6 |
| 4,570,676 A * | 2/1986 | Nishio et al. | | 297/284.6 X |
| 4,580,837 A * | 4/1986 | Bayley | | 297/284.6 X |
| 4,589,695 A * | 5/1986 | Isono | | 297/284.9 |
| 4,592,588 A * | 6/1986 | Isono et al. | | 297/284.6 |
| 4,597,386 A * | 7/1986 | Goldstein | | 297/230.13 X |
| 4,619,481 A * | 10/1986 | Grudzinskas | | 297/284.1 |
| 4,634,083 A * | 1/1987 | McKinnon | | 297/284.6 X |

(Continued)

FOREIGN PATENT DOCUMENTS

CA     2244955 A1     2/1999

(Continued)

*Primary Examiner*—Rodney B White
(74) *Attorney, Agent, or Firm*—Kang Intellectual Property Law, LLC; Grant D. Kang

(57) ABSTRACT

A configurable vehicle seat having at least two configurations is disclosed. The configurable vehicle seat has a seat base, a seat bottom supported by the seat base, and a seat back coupled to the seat base. The seat back or seat bottom has one or more adjustable profile members, wherein the adjustable profile members may be adjusted such that the seat is adjusted from at least a first configuration to a second configuration.

25 Claims, 11 Drawing Sheets

U.S. PATENT DOCUMENTS

| | | | |
|---|---|---|---|
| 4,634,179 A * | 1/1987 | Hashimoto et al. | 297/284.6 |
| 4,636,000 A | 1/1987 | Nishino | |
| 4,655,505 A * | 4/1987 | Kashiwamura et al. | 297/284.6 |
| 4,707,027 A | 11/1987 | Horvath et al. | |
| 4,722,550 A * | 2/1988 | Imaoka et al. | 297/DIG. 3 X |
| 4,772,070 A * | 9/1988 | Leto et al. | 297/228.12 |
| 4,862,536 A * | 9/1989 | Pruit | 297/284.5 |
| 4,965,899 A * | 10/1990 | Sekido et al. | 297/284.6 |
| 5,054,854 A * | 10/1991 | Pruit | 297/284.3 |
| 5,127,708 A * | 7/1992 | Kishi et al. | 297/284.1 |
| 5,129,704 A * | 7/1992 | Kishi et al. | 297/284.1 |
| 5,135,282 A * | 8/1992 | Pappers | 297/284.3 |
| 5,263,765 A * | 11/1993 | Nagashima et al. | 297/284.6 |
| 5,320,409 A * | 6/1994 | Katoh et al. | 297/284.6 |
| 5,364,167 A | 11/1994 | Aoki et al. | |
| 5,461,741 A * | 10/1995 | Graebe | 5/654 |
| 5,587,933 A * | 12/1996 | Gross | 297/284.3 X |
| 5,662,384 A * | 9/1997 | O'Neill et al. | 297/452.41 |
| 5,678,266 A * | 10/1997 | Petringa et al. | 5/655.5 |
| 5,678,891 A * | 10/1997 | O'Neill et al. | 297/284.6 |
| 5,713,631 A * | 2/1998 | O'Neill et al. | 297/284.6 |
| 5,769,498 A | 6/1998 | Smith et al. | |
| 5,803,544 A | 9/1998 | Block et al. | |
| 5,860,699 A * | 1/1999 | Weeks | 297/284.6 |
| 5,871,255 A * | 2/1999 | Harland et al. | 297/378.13 X |
| 5,879,053 A | 3/1999 | Lux et al. | |
| 5,884,968 A | 3/1999 | Massara | |
| 5,934,749 A | 8/1999 | Pond et al. | |
| 6,036,271 A * | 3/2000 | Wilkinson et al. | 297/452.41 |
| 6,088,643 A * | 7/2000 | Long et al. | 297/284.3 X |
| 6,098,000 A * | 8/2000 | Long et al. | 297/284.6 X |
| 6,238,002 B1 | 5/2001 | Brewer et al. | |
| 6,378,941 B1 * | 4/2002 | Opfer et al. | 297/378.12 X |
| 6,386,629 B1 * | 5/2002 | Severinski et al. | 297/234 X |
| 6,454,352 B1 * | 9/2002 | Konovalov et al. | 297/219.12 |
| 6,467,841 B1 * | 10/2002 | Henschel et al. | 297/284.5 |
| 6,497,454 B1 * | 12/2002 | Davidsson | 297/284.3 |
| 6,679,557 B2 * | 1/2004 | Craft et al. | 297/452.41 |
| 6,682,059 B1 * | 1/2004 | Daniels et al. | 297/284.6 X |
| 6,767,060 B2 * | 7/2004 | Craft et al. | 297/284.1 |
| 6,782,573 B2 * | 8/2004 | Odderson | 5/654 |
| 6,802,563 B1 | 10/2004 | Mysliwiec et al. | |
| 6,895,988 B2 * | 5/2005 | Grant et al. | 297/284.6 X |
| 6,896,325 B2 * | 5/2005 | Takedomi et al. | 297/284.9 X |
| 6,901,617 B2 * | 6/2005 | Sprouse et al. | 5/654 |
| 6,955,386 B2 * | 10/2005 | Rhodes et al. | 297/15 X |
| 7,093,898 B2 * | 8/2006 | Ladron De Guevara | 297/284.6 |
| 7,152,920 B2 * | 12/2006 | Sugiyama et al. | 297/284.6 |
| 7,156,467 B2 * | 1/2007 | Kimmig | 297/452.41 |
| 7,322,652 B1 * | 1/2008 | Tache et al. | 297/284.9 |
| 7,357,454 B2 * | 4/2008 | Schiener et al. | 297/284.9 |
| 2002/0180249 A1 * | 12/2002 | Felton et al. | 297/284.6 |
| 2003/0038517 A1 | 2/2003 | Moran et al. | |
| 2003/0090133 A1 * | 5/2003 | Nathan et al. | 297/217.3 |
| 2003/0230917 A1 * | 12/2003 | Dorfler et al. | 297/284.1 |
| 2004/0108760 A1 | 6/2004 | McMillen | |
| 2005/0231014 A1 * | 10/2005 | Carlisle | 297/284.7 |

FOREIGN PATENT DOCUMENTS

| | | | | |
|---|---|---|---|---|
| CA | 2323542 A1 | | 9/1999 | |
| DE | 3334864 A1 * | | 4/1985 | 297/284.6 |
| DE | 3839130 C1 * | | 4/1990 | 297/284.3 |
| FR | 2557441 A1 * | | 7/1985 | 297/284.6 |
| GB | 2368518 A | | 5/2002 | |
| JP | 360197436 A | | 10/1985 | |
| JP | 05228038 A * | | 9/1993 | 297/284.9 |

* cited by examiner

APPARATUS AND METHOD FOR CONFIGURABLE SEATING

CROSS-REFERENCE TO RELATED APPLICATIONS

None.

BACKGROUND OF THE INVENTION

1. Field of the Invention

The present invention relates to a vehicle seat and, more particularly, to a vehicle seat that is adjustable from at least a first configuration to a second configuration.

2. Related Art

A popular feature in vehicles having cargo space such as sport utility vehicles, station wagons and the like is fold down rear seats. Folding these seats down increases the cargo space. For that purpose, it is advantageous that the seat backs of the fold down rear seats be as thin as possible in a stowed position.

Typically, these so-called "fold down" seats have a single configuration that is deemed acceptable for the broadest range of users. However, it would be desirable to have a seat which is configurable by the user for different purposes. For example, car pool members may desire to have a first configuration, whereas parents may desire to have a second configuration for use by their children.

Therefore, there is a need in the art for a vehicle seat that has multiple configurations. Further there is a continuing need in the art to make fold down seats more convenient and user friendly.

SUMMARY OF THE INVENTION

The invention is configurable vehicle seat having at least two configurations. The configurable vehicle seat has a seat base, a seat bottom supported by the seat base, and a seat back coupled to the seat base. The seat back or the seat bottom has at least one adjustable profile member, wherein the at least one adjustable profile member may be adjusted such that the seat back or seat bottom is adjusted from at least a first configuration to a second configuration. In this manner, a seat occupant can adjust the seat configuration for a plurality of uses.

In one aspect of the invention, there is provided an adjustable profile member assembly for a bench-type vehicle seat. The assembly includes a first adjustable profile member and a second adjustable profile member. The first adjustable profile member has both a flat profile configuration and a non-flat profile configuration. The second adjustable profile member is spaced apart from the first adjustable profile member and has both a flat profile configuration and a non-flat profile configuration. The assembly also includes an actuating mechanism connected to the adjustable profile members and a master activation mechanism for activating one of the adjustable profile members. The master activation mechanism is used to adjust the adjustable profile members, either independently or concurrently, to one of a flat profile configuration or a non-flat profile configuration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
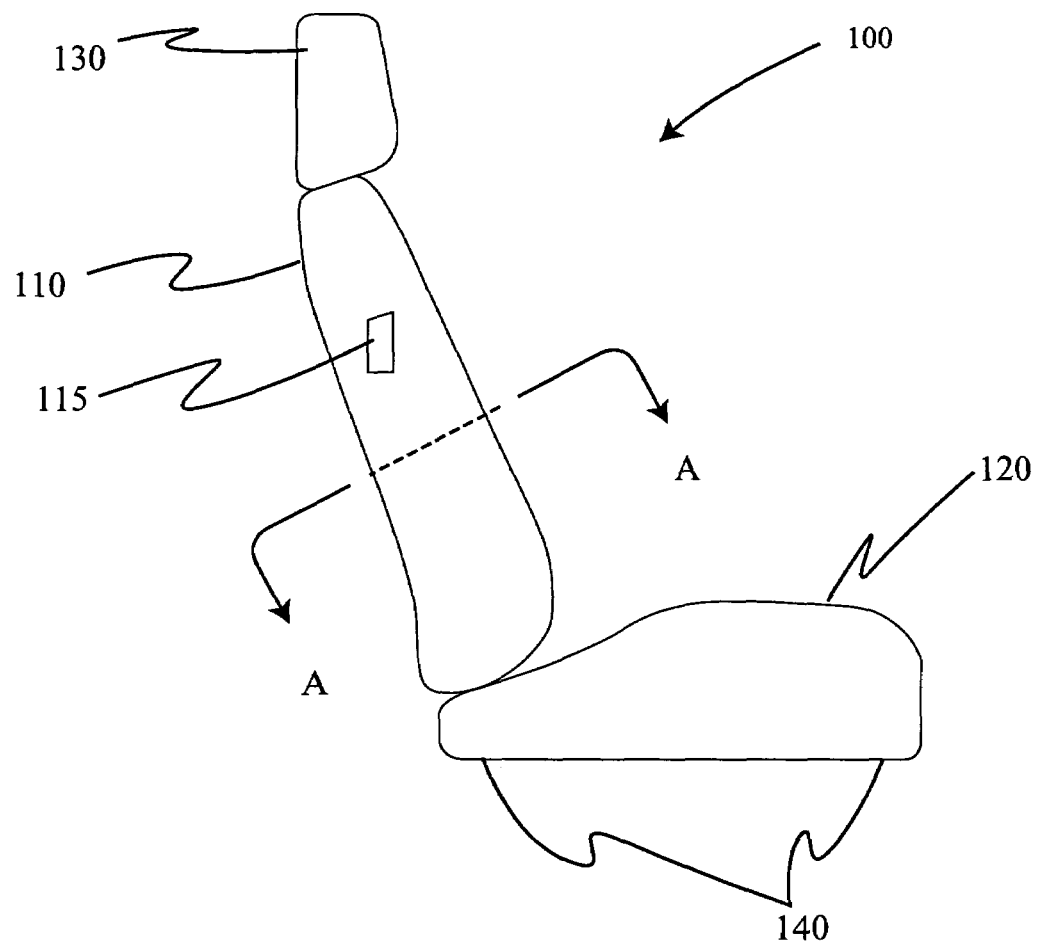
FIG. 1 is a side view of a seat having a section A-A.

FIG. 1 is a seat 100 having a seat back 110 and seat bottom 120. Optionally, the seat 100 may have a headrest 130. The seat bottom 120 may be mounted to a seat riser or base 140. The seat base 140 can be mounted in a vehicle (not shown). The seat back 110 is pivotally connected to the seat bottom 120 and may fold over to minimize the space required for the seat 100. The seat 100 has at least a first configuration and a second configuration. For example, the first configuration may be a "flat" configuration and the second configuration may be a "non-flat" configuration. As used herein, "flat"

means the seat back and/or seat bottom have a thin profile such that the seat back may be folded over onto the seat bottom to a stowed position.

The seat 100 also includes a master activation mechanism 115, which will be described in greater detail below. The master activation mechanism 115 is mounted on the seat back 110 in the embodiment depicted in FIG. 1 but the master activation mechanism 115 may be mounted elsewhere. While only one master activation mechanism is shown in the depicted embodiment, those skilled in the art would understand that the seat 100 may have more than one master activation mechanism 115. For example, there may be a master activation mechanism 115 located on each side of the seat 100.

Figure 2:
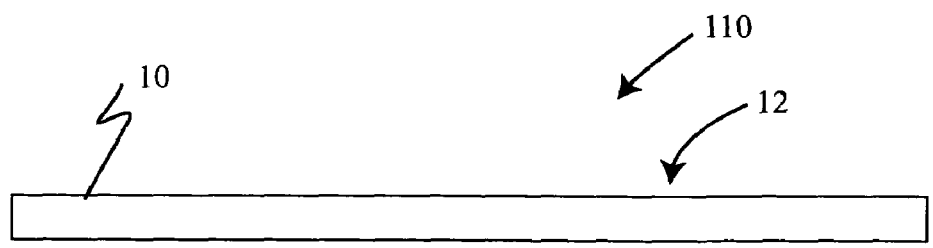
FIG. 2 is sectional top view of a first embodiment of a seat back shown along section A-A in FIG. 1.

The seat back 110 is illustrated in FIG. 2 in a first embodiment. The seat back 110 has a seat cushion 10 and a seat cover 12. The seat cover 12 covers the cushion 10. In the depicted embodiment of FIG. 2, the seat back 110 has a thin, first configuration. This allows the seat back 110 to be folded flat relative to the seat bottom 120.

Figure 3:
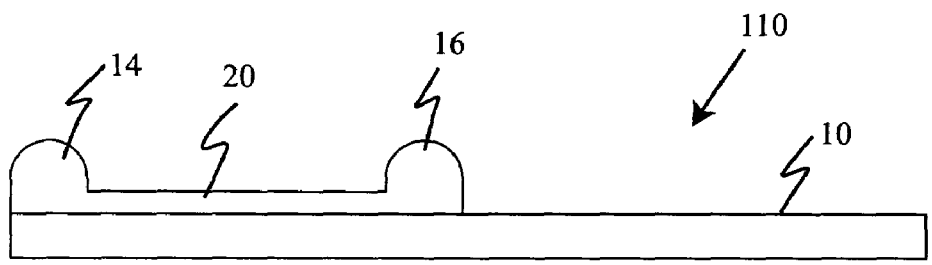
FIG. 3 is a sectional top view of a second embodiment of a seat back taken along section A-A in FIG. 1.

FIG. 3 illustrates a second embodiment of the seat back 110 wherein the seat 100 has a non-flat configuration. In the embodiment depicted in FIG. 3, the seat back 110 includes a first profile member 14 and a second profile member 16. As examples, the profile members 14, 16 may be mechanical devices, air bladders, or foam/fiber displacement mechanisms. Through the use of the profile members 14, 16, the seat 100 can be adjusted from the first configuration illustrated in FIG. 2 to the configuration illustrated in FIG. 3. The seat back 110 may also include a first support 20 located in between the first profile member 14 and the second profile member 16. The first support 20 may be a lumbar support or an upper back support. In the embodiment depicted in FIG. 3, the profile members 14, 16 represent side bolsters or some other type of ergonomic device. In the embodiment depicted in FIG. 3, the first profile member 14, the second profile member 16, and the first support 20 allow for the seat back 110 to have a "50% seat back" fractional configuration.

Figure 4:
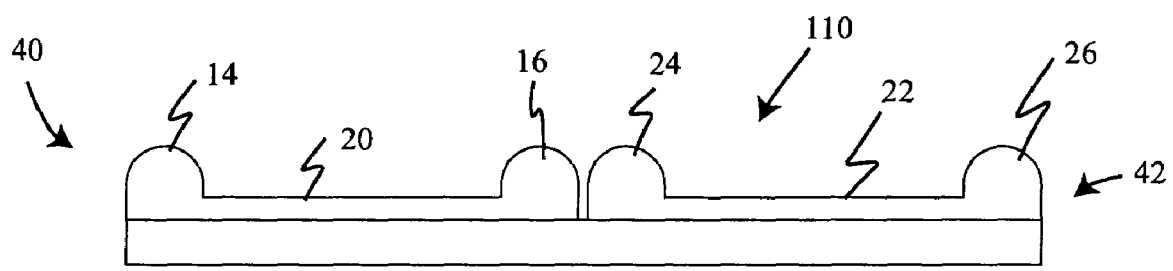
FIG. 4 is a sectional top view of a third embodiment of a seat back taken along section A-A in FIG. 1.

FIG. 4 illustrates a third embodiment of the seat back 110 wherein the seat 100 has a non-flat configuration. The seat back 110 includes the first profile member 14, the first support 20, the second profile member 16, a third profile member 24, a second support 22, and a fourth profile member 26. The seat back 110 includes a first side 40 and second side 42. In the embodiment depicted in FIG. 4, the first profile member 14 is located on the first side 40, and the fourth profile member 26 is located on the second side 42. The first support 20 is located in between the first profile member 14 and the second profile member 16. The second support 22 is located between the third profile member 24 and the fourth profile member 26. As an example, the first support 20 or the second support 22 may be a lumbar support or an upper back support. The profile members 14, 16, 24, 26 allow for the seat back 110 to have a "50/50 seat back" fractional configuration. In other words, through the use of the profile members 14, 16, 24, 26, the seat 100 can be adjusted from the first configuration illustrated in FIG. 2 to the configuration illustrated in FIG. 4.

Figure 5:
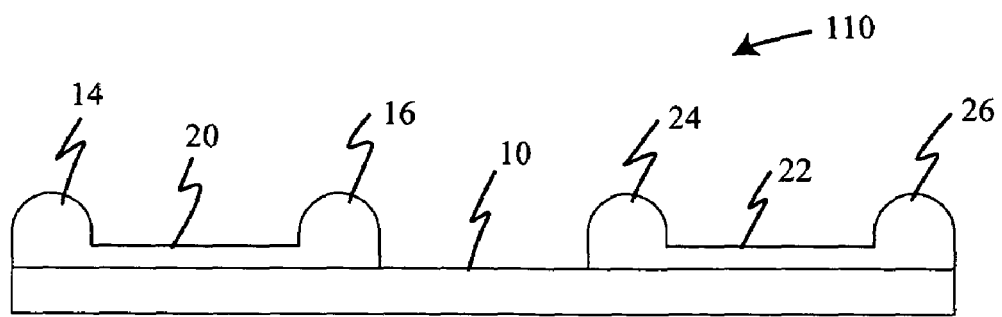
FIG. 5 is sectional top view of a fourth embodiment of a seat back taken along section A-A in FIG. 1.

FIG. 5 illustrates a fourth embodiment of a seat back 110 wherein the seat 100 has a non-flat configuration. The seat back 110 in the embodiment depicted in FIG. 5 includes the first profile member 14, the first support 20, the second profile member 16, the third profile member 24, the second support 22, and the fourth profile member 26. In the embodiment depicted in FIG. 5, the second profile member 16 is spaced apart from the third profile member 24. The layout of the profile members 14, 16, 24, and 26 provides a "40/40 seat back" fractional configuration and allows the seat 100 to be adjusted from the first configuration illustrated in FIG. 2 to the configuration illustrated in FIG. 5.

Figure 6:
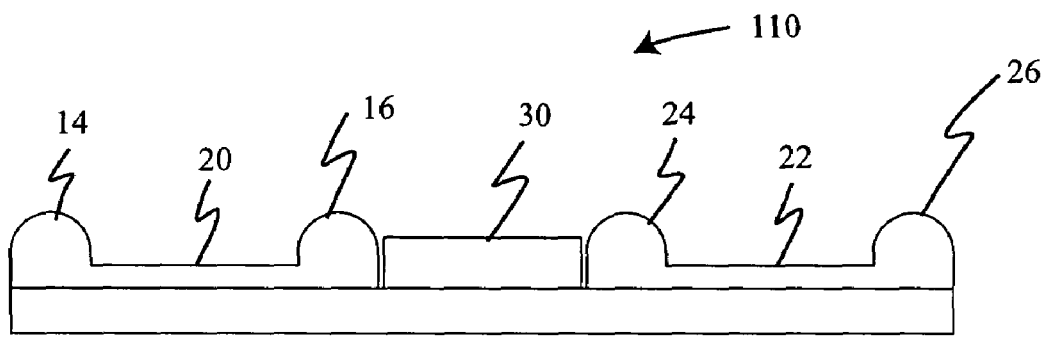
FIG. 6 is a sectional top view of a fifth embodiment taken along section A-A of the seat back in FIG. 1.

FIG. 6 illustrates a fifth embodiment of a seat back 110 wherein the seat 100 has a non-flat configuration. The seat back 110 includes the first profile member 14, the first support 20, the second profile member 16, a third support 30, the third profile member 24, the second support 22, and the fourth profile member 26. The third support 30 is comprised of two supports with one overlying the other. Put another way, the third support 30 is comprised of two supports stacked on top of one another against the seat cushion 10.

Figure 7:
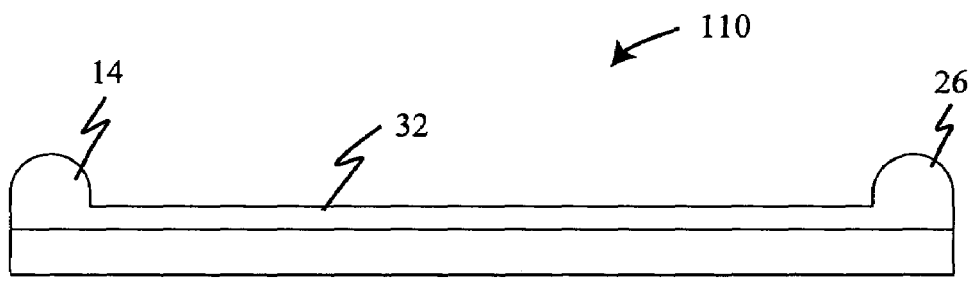
FIG. 7 is a sectional top view of a sixth embodiment of the seat back taken along section A-A in FIG. 1.

FIG. 7 illustrates a sixth embodiment of a seat back 110 in a non-flat configuration. The seat back 110 includes the first profile member 14 and the fourth profile member 26. Some embodiments may also include a fourth support 32. In the embodiment depicted in FIG. 7, the fourth support 32 extends all the way across the entire seat back 110 and is connected to the first profile member 14 and the fourth profile member 26. The profile member 14, the fourth support 32, and the fourth profile member 26 provide a seat back 110 with a "love seat back" configuration. In other words, through the use of the profile members 14, 26, the seat 100 can be adjusted from the first configuration illustrated in FIG. 2 to the configuration illustrated in FIG. 7.

Figure 8:
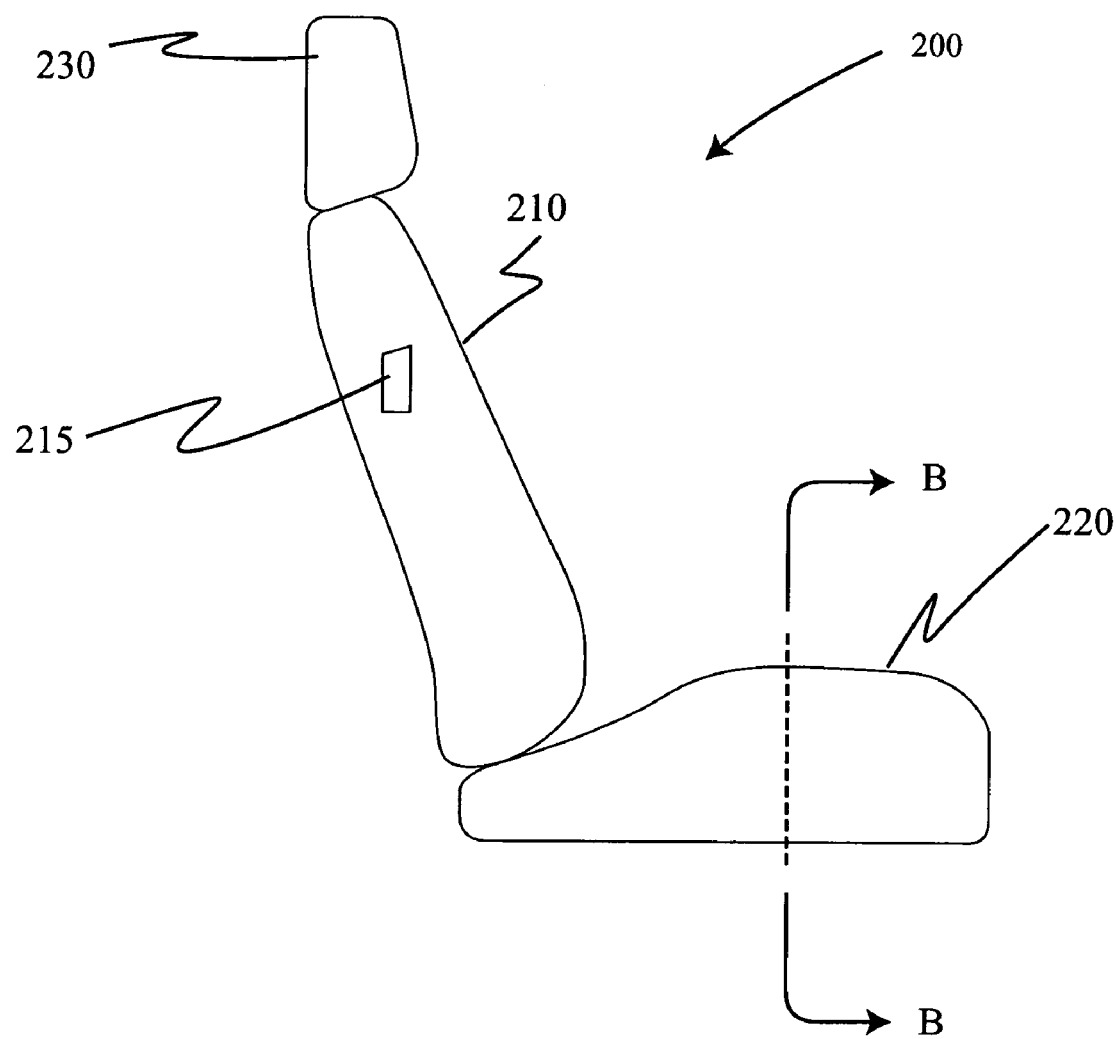
FIG. 8 is a side view of a seat having a section B-B.

FIG. 8 is a seat 200 having a seat bottom 220 and seat back 210. Optionally, the seat 200 may have a headrest 230. The seat back 210 is pivotally connected to the seat bottom 220 and may fold over to minimize the space required for the seat 200. The seat 200 also includes a master activation mechanism 215, which will be described in greater detail below. The master activation mechanism 215 is mounted on the seat back 210 in the embodiment depicted in FIG. 8 but may be mounted elsewhere.

Figure 9:
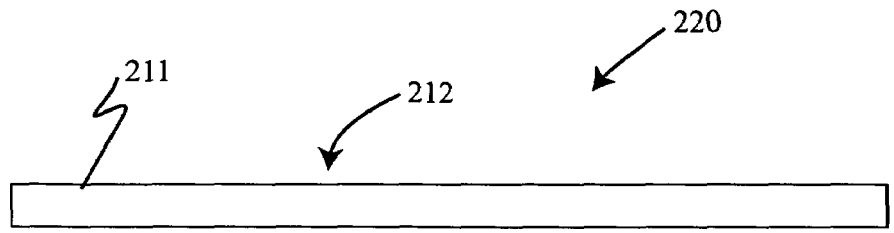
FIG. 9 is sectional top view of a first embodiment of a seat bottom shown along section B-B in FIG. 8.

The seat bottom 220 is illustrated in FIG. 9 in a first embodiment. The seat bottom 220 has a seat cushion 211 and a seat cover 212. The seat cover 212 covers the cushion 211. In the depicted embodiment of FIG. 9, the seat bottom 220 has a thin, first configuration that allows the seat 200 to be folded flat.

Figure 10:
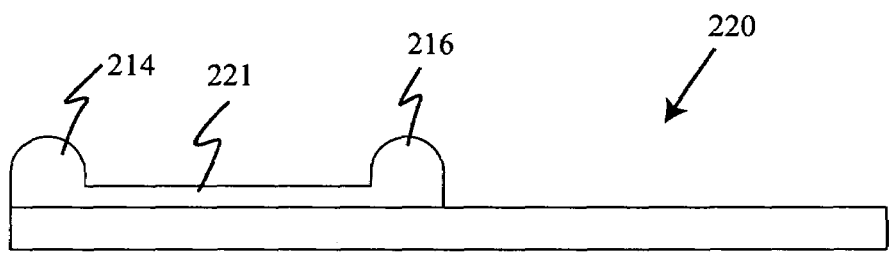
FIG. 10 is a sectional top view of a second embodiment of a seat bottom taken along section B-B in FIG. 8.

FIG. 10 illustrates a second embodiment of the seat bottom 220 wherein the seat 200 has a non-flat configuration. In the embodiment depicted in FIG. 10, the seat bottom 220 includes a first profile member 214 and a second profile member 216. As examples, the profile members 214, 216 may be mechanical devices, air bladders, or foam/fiber displacement mechanisms. Through the use of the profile members 214, 216, the seat 200 can be adjusted from the first configuration illustrated in FIG. 9 to the configuration illustrated in FIG. 10. The seat bottom 220 may also include a first support 221 located in between the first profile member 214 and the second profile member 216. The first support 221 may be a thigh support. The profile members 214, 216 represent side bolsters or some other type of ergonomic device. In the embodiment depicted in FIG. 10, the first profile member 214, the second profile member 216 and the first support 221 allow for the seat bottom 220 to have a "50% seat cushion" configuration.

Figure 11:
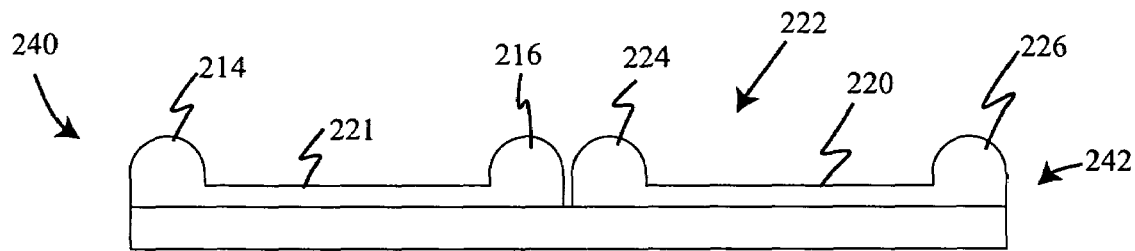
FIG. 11 is a sectional top view of a third embodiment of a seat bottom taken along section B-B in FIG. 8.

FIG. 11 illustrates a third embodiment of the seat bottom 220 wherein the seat 200 has a non-flat configuration. The seat bottom 220 includes the first profile member 214, the first support 221, the second profile member 216, a third profile member 224, a second support 222, and a fourth profile member 226. The seat bottom 220 includes a first side 240 and second side 242. In the embodiment depicted in FIG. 11, the first profile member 214 is located on the first side 240, and the fourth profile member 226 is located on the second side 242. The first support 221 is located in between the first profile member 214 and the second profile member 216. The second support 222 is located between the third profile member 224 and the fourth profile member 226. As an example, the first support 221 or the second support 222 may be a thigh support. The profile members 214, 216, 224, 226 allow for the seat bottom 220 to have a "50/50 seat cushion" configuration. In other words, through the use of the profile members 214, 216, 224, 226, the seat 200 can be adjusted from the first configuration illustrated in FIG. 9 to the configuration illustrated in FIG. 11.

Figure 12:
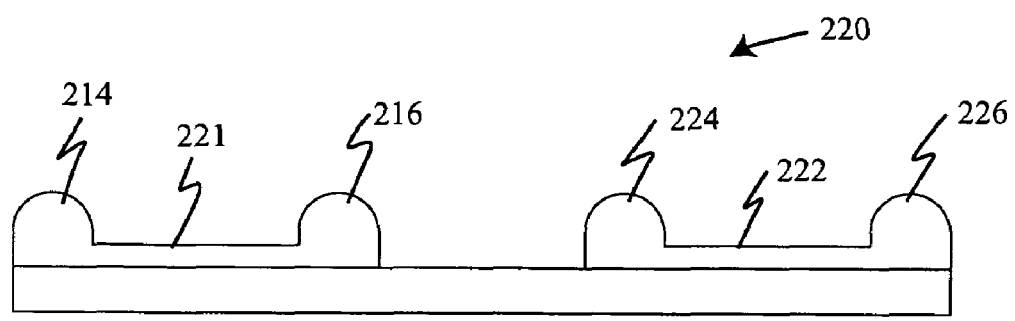
FIG. 12 is sectional top view of a fourth embodiment of a seat bottom taken along section B-B in FIG. 8.

FIG. 12 illustrates a fourth embodiment of a seat bottom 220 wherein the seat 200 has a non-flat configuration. The seat bottom 220 in the embodiment depicted in FIG. 12 includes the first profile member 214, the first support 221, the second profile member 216, the third profile member 224, the second support 222, and the fourth profile member 226. In the embodiment depicted in FIG. 12, the second profile member 216 is spaced apart from the third profile member 224. The layout of the profile members 214, 216, 224, and 226 provides a "40/40 seat cushion" configuration and allows the seat 200 to be adjusted from the first configuration illustrated in FIG. 9 to the configuration illustrated in FIG. 12.

Figure 13:
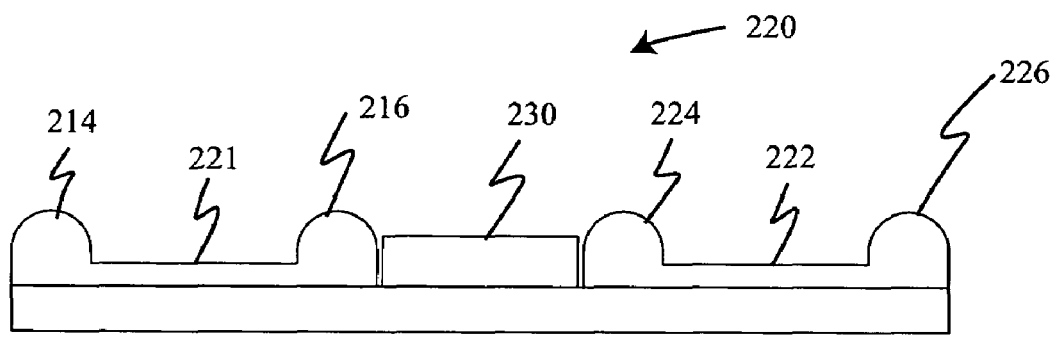
FIG. 13 is a sectional top view of a fifth embodiment taken along section B-B of the seat bottom in FIG. 8.

FIG. 13 illustrates a fifth embodiment of a seat bottom 220 wherein the seat 200 has a non-flat configuration. The seat bottom 220 includes the first profile member 214, the first support 221, the second profile member 216, a third support 230, the third profile member 224, the second support 222, and the fourth profile member 226. The third support 230 is comprised of two supports with one overlying the other. Put another way, the third support 230 is comprised of two supports stacked on top of one another against the seat cushion 211.

Figure 14:
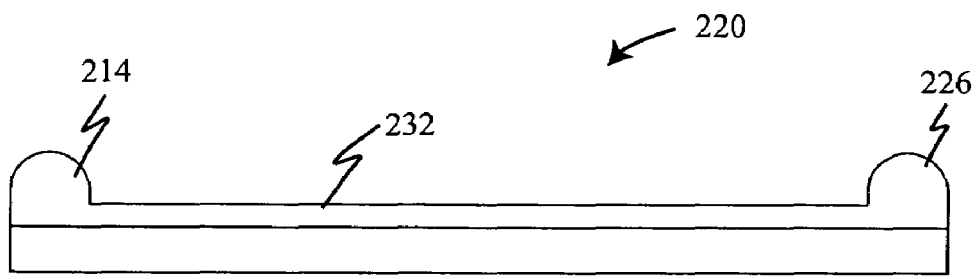
FIG. 14 is a sectional top view of a sixth embodiment of the seat bottom taken along section B-B in FIG. 8.

FIG. 14 illustrates a sixth embodiment of a seat bottom 220 wherein the seat 200 has a non-flat configuration. The seat bottom 220 includes the first profile member 214 and the fourth profile member 226. Some embodiments also include a fourth support 232. In the embodiment depicted in FIG. 14, the fourth support 232 extends all the way across the entire seat bottom 220 and is connected to the first profile member 214 and the fourth profile member 226. The profile member 214, the fourth support 232, and the fourth profile member 226 provide a seat bottom 220 with a "love seat cushion" configuration in the embodiment depicted in FIG. 14. Through the use of the profile members 214, 226, the seat 200 can be adjusted from the first configuration illustrated in FIG. 9 to the configuration illustrated in FIG. 14.

Figure 15:
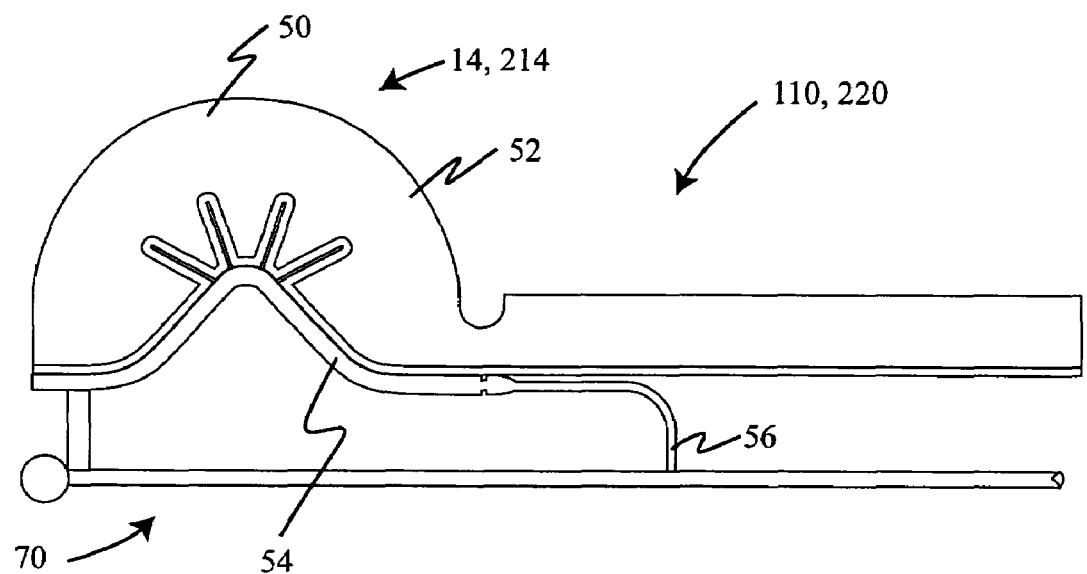
FIG. 15 is a sectional top view of an adjustable profile member in a first embodiment and in a first position.

FIG. 15 illustrates a first embodiment of an adjustable profile member, such as the first profile member 14, 214, in a first embodiment and in a first position. The adjustable profile member includes a foam/fiber pad 50, a foam/fiber support 52, a displacement member 54, and an actuator mechanism 56. The foam/fiber support 52 includes internal voids 53 that allow the foam/fiber pad 50 to achieve a predefined shape when the displacement member 54 is displaced. In the embodiment depicted in FIG. 15, the seat back 110 includes a seat frame 70, and the adjustable profile member is mounted to the frame 70. The displacement member 54 is engaged by the actuator mechanism 56. In the embodiment depicted in FIG. 15, the actuator mechanism 56 is a cable, such as a Bowden cable. When a tractive force is applied to the actuator mechanism 56, the displacement member 54 engages and pushes the foam/fiber pad 50 into the first position.

Figure 16:
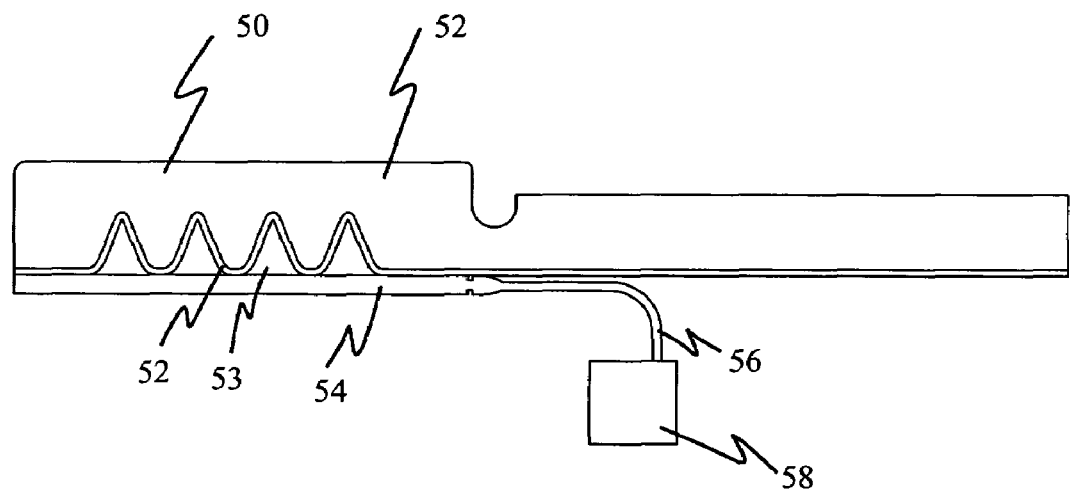
FIG. 16 is a sectional top view that illustrates the first embodiment of the adjustable profile member in a second position.

FIG. 16 illustrates a second position of a first embodiment of the adjustable profile member. In the embodiment depicted in FIG. 16, the displacement member 54 is not engaged with the foam/fiber pad 50. In some embodiments, an actuator 58 is connected to the actuator mechanism 56. The actuator 58 may be any of a number of electro-mechanical devices to actuate the actuator mechanism 56. The actuator 58 is electrically connected to the master activation mechanism 115. The master activation mechanism 115 sends an electrical signal to the actuator 58, and the actuator 58 then applies a force, which may be a tractive force, to the actuator mechanism 56 for engagement of the adjustable profile member. In this manner, the seat occupant can select via the master activation mechanism 115 the desired seat configuration.

Figure 17:
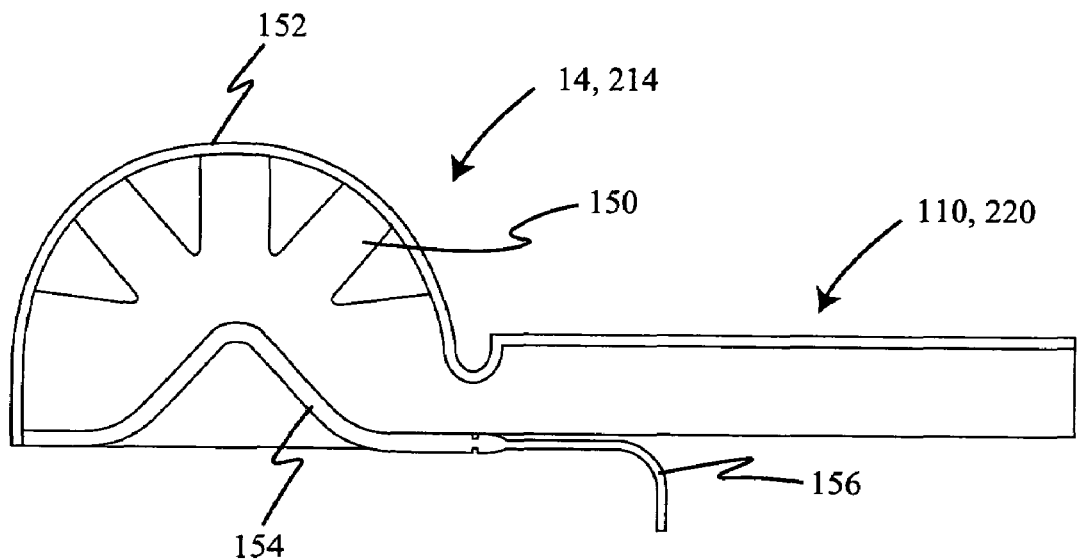
FIG. 17 is a sectional top view of a second embodiment of the adjustable profile member in a first position.
Figure 18:
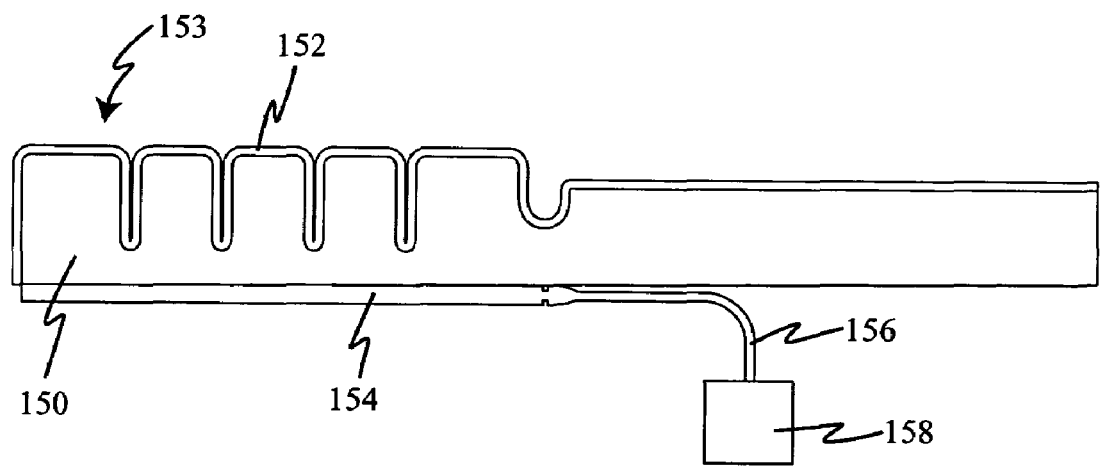
FIG. 18 is a sectional top view of the second embodiment of the adjustable profile member in a second position.

FIGS. 17 and 18 illustrate a second embodiment of the adjustable profile member. The adjustable profile member includes a foam/fiber pad 150, a foam/fiber support 152, a displacement member 154, and an actuator mechanism 156. The foam/fiber support 152 includes external voids 153 that allow the foam/fiber pad 150 to achieve a predefined shape when the displacement member 154 is displaced. The actuator mechanism 156 is actuated to engage the displacement member 154. The displacement member 154 is engaged to adjust the adjustable profile member from a first position to a second position. In some embodiments, an actuator 158 is connected to the actuator mechanism 156. The actuator 158 may be any of a number of electro-mechanical devices to actuate the actuator mechanism 156. An electrical signal is sent to the actuator 158, and the actuator 158 then applies a force, which may be a tractive force, to the actuator mechanism 156.

Figure 19:
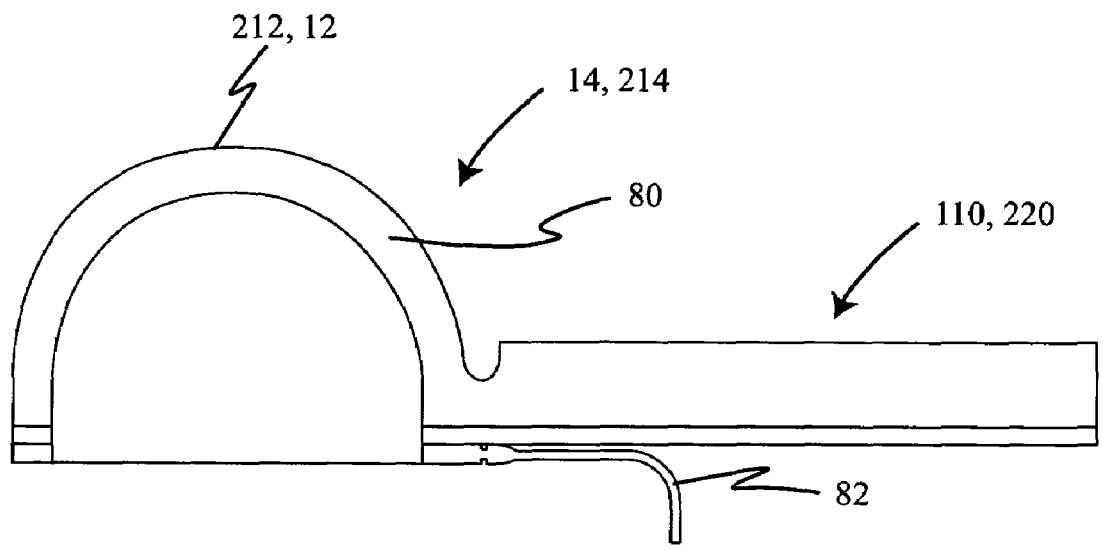
FIG. 19 is a sectional top view of a third embodiment of the adjustable profile member in a first position.
Figure 20:
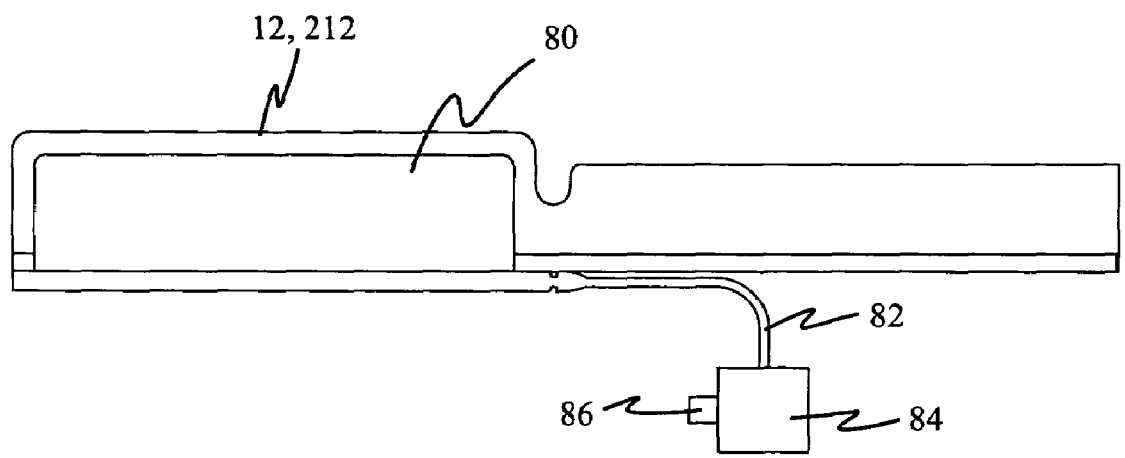
FIG. 20 is a sectional top view of the third embodiment of the adjustable profile member in a second position.

FIGS. 19 and 20 illustrate a third embodiment of the adjustable profile member. In the embodiment depicted in FIGS. 19 and 20, the adjustable profile member 14, 214 includes an air bladder 80. The air bladder 80 is covered by the seat cover 12, 212. FIG. 19 illustrates a first position of the adjustable profile member 14, 214 wherein the air bladder 80 is inflated. FIG. 20 illustrates a second position of the adjustable profile member 14, 214 wherein the air bladder 80 is deflated. An air supply tube 82 is connected to the air bladder 80. In some embodiments, an air compressor 84 supplies air via the air supply tube 82 to the air bladder 80. The air compressor 84 may include a dump valve 86 for removing air from the air bladder 80. The air compressor 84 is electrically connected to the master activation mechanism 115. In this manner, the seat occupant can use the master activation mechanism 115 to activate the air compressor 84 to inflate or deflate the air bladder 80 depending upon the desires of the seat occupant.

The supports 20, 22, 30, 32, 221, 222, 230, 232 can be any number of mechanical devices, air bladders, or foam/fiber displacement mechanisms. Further, the supports 20, 22, 30, 32, 221, 222, 230, 232 may use structure similar to that of the adjustable profile members. As an example, the support may be in the form of an air bladder, an air supply tube connected to the air bladder, and an air compressor to provide compressed air to the air supply tube as disclosed above.

Figure 21:
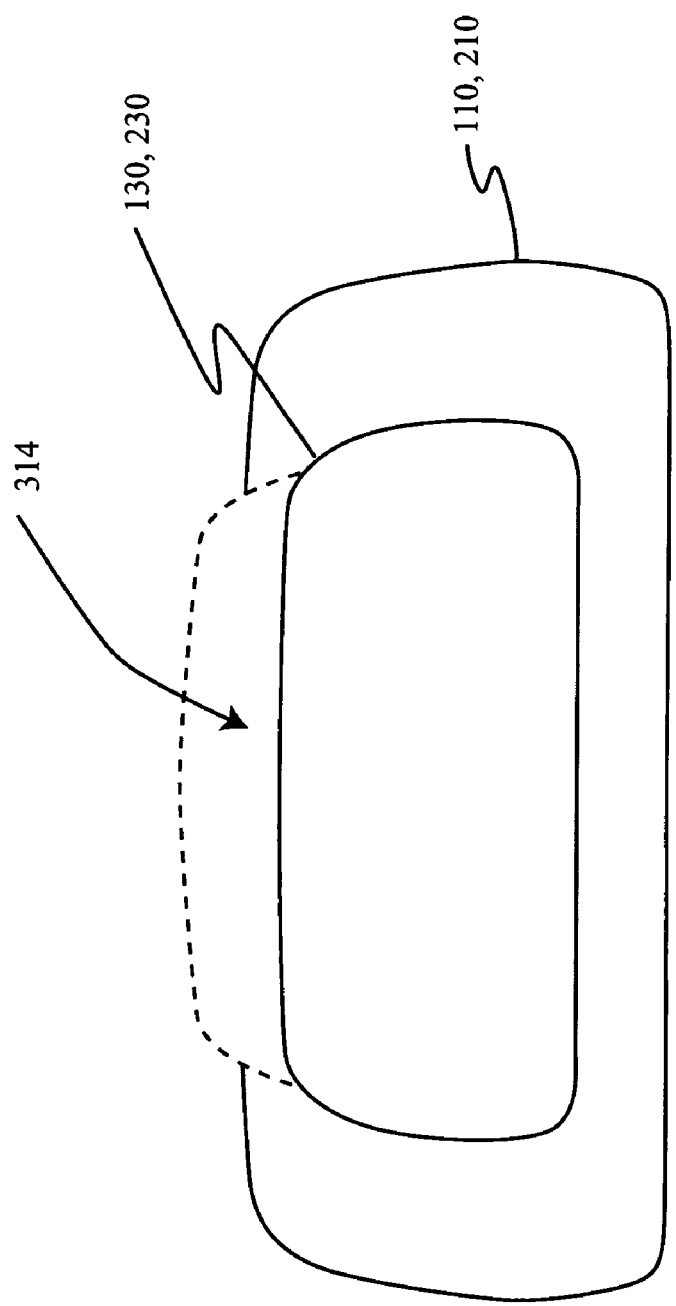
FIG. 21 is a top view of the seat headrest in an alternative embodiment.

FIG. 21 illustrates an alternative embodiment of the headrest 130, 230. The headrest 130, 230 may contain an adjustable profile member 314 such that the headrest may be adjusted from a stowed position to a deployed position. In the embodiment depicted in FIG. 19, the deployed position is illustrated in phantom. As examples, the adjustable profile member 314 may be mechanical devices, air bladders, or foam/fiber displacement mechanisms.

Figure 22:
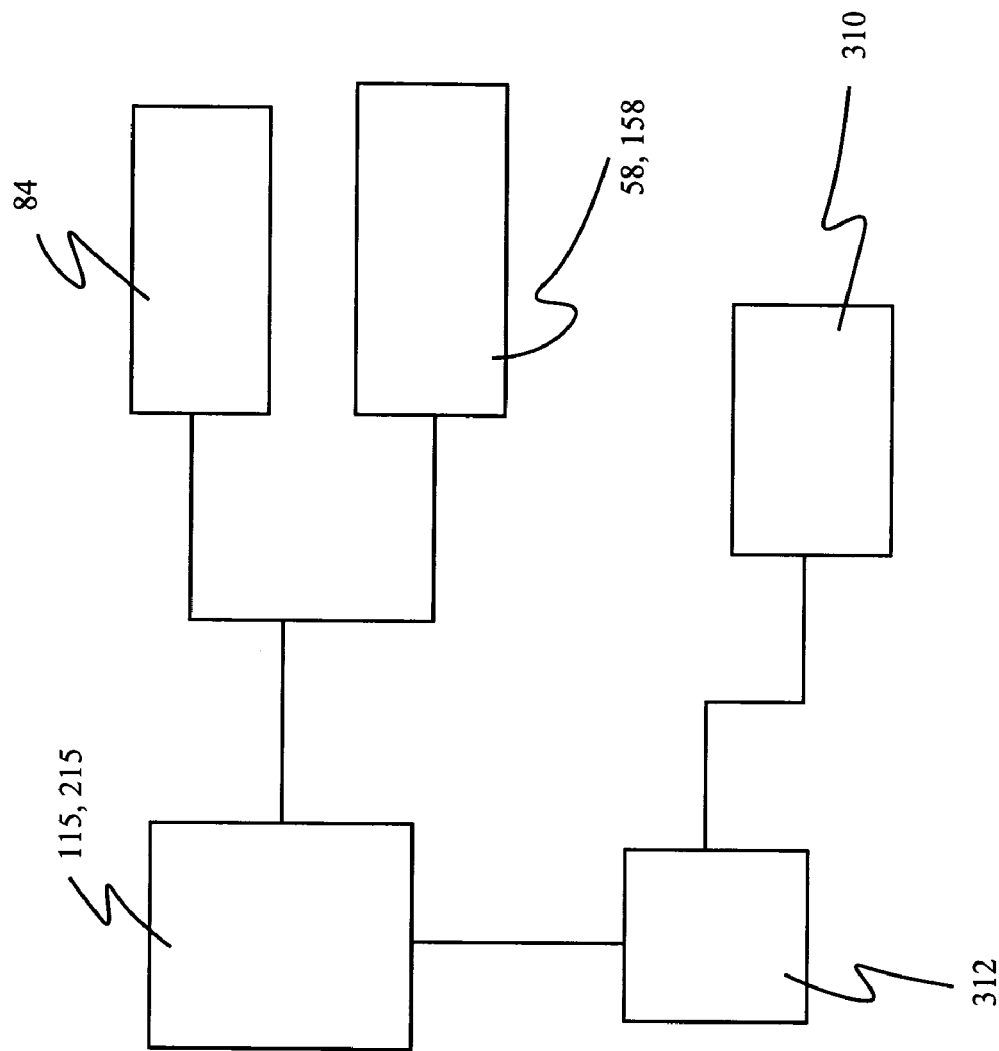
FIG. 22 is an electrical schematic illustrating a master activation mechanism in a first embodiment.

FIG. 22 is an electrical schematic illustrating the master activation mechanism 115, 215. The master activation mechanism 115, 215 is electrically connected to at least one actuating mechanism for actuating the adjustable profile member, such as the air compressor 84 or the actuator 58, 158. The master activation mechanism 115, 215 sends an electric signal to one of the actuators for engagement of one or more of the profile members. As an example, the master activation mechanism 115, 215 may be a two position, momentary switch. Power is supplied from a power source 310, such as a vehicle's electrical system, to the master activation mechanism 115, 215. In some embodiments, a cut-off switch 312 is located intermediate the power source 310 and the master activation mechanism 115, 215. The cut-off switch 312 may be used to disconnect the master activation mechanism 115, 215 from the power source 310. For example, the cut-off switch 312 may be used to disconnect the master activation mechanism 115, 215 from the power source 310 when the vehicle's ignition system is turned off.

In operation, a user decides to alter the configuration of the second and/or third row a bench-type vehicle seat. Initially, the bench-type vehicle seat is folded flat in a stowed position, and the bench-type vehicle seat has a very thin profile or thickness. The user then raises the bench-type vehicle seat to a deployed position. When the bench-type vehicle seat is raised, the bench-type vehicle seat still has a very thin profile. The user then presses the master activation mechanism. When the master activation mechanism is pressed, the adjustable profile members are actuated and "pop-out" of the bench-type vehicle seat. For example, side bolsters may "pop-out" of the bench-type vehicle seat when the adjustable profile members are engaged. In between the adjustable profile members, supports, such as lumbar supports, may also "pop-out." In this manner, the contour of the seat back or seat bottom can be altered by adding or removing features to achieve a desired seat configuration.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An adjustable profile member assembly for a bench-type vehicle seat comprising:
   a. a first adjustable profile member, the first adjustable profile member being adjustable between a first position and a second position, wherein the first adjustable profile member has a non-flat profile configuration in the first position while the first adjustable profile member has a flat profile configuration in the second position, wherein the first adjustable profile member is located at a fixed location between a first side of the bench-type vehicle seat and a second side of the bench-type vehicle seat such that when the first adjustable profile member is in the non-flat profile configuration in the first position the bench-type vehicle seat is partitioned into a first fraction and a second fraction such that the first fraction and the second fraction can be used separately;
   b. a second adjustable profile member located at a fixed location spaced apart from the first adjustable profile member, the second adjustable profile member being adjustable between a first position and a second position, wherein the second adjustable profile member has a non-flat profile configuration in the first position while the second adjustable profile member has a flat profile configuration in the second position;
   c. an actuating mechanism operatively connected to the first adjustable profile member and the second adjustable profile member such that the first adjustable profile member can be adjusted between the first position and the second position and such that the second adjustable profile member can be adjusted between the first position and the second position;
   d. a master activation mechanism electrically connected to the actuating mechanism, wherein through the use of the master activation mechanism a user can adjust the bench-type vehicle seat between a first configuration of the bench-type vehicle seat wherein the first adjusting member is in the first position and a second configuration of the bench-type vehicle seat wherein the first adjusting member is in the second position.

2. The adjustable profile member assembly according to claim 1, wherein the first adjustable profile member includes an air bladder.

3. The adjustable profile member assembly according to claim 1, wherein the seat further comprises an additional adjustable profile member, the additional adjustable profile member being adjustable between a first position and a second position wherein the additional adjustable profile member has a non-flat profile configuration in the first position while the additional adjustable profile member has a flat profile configuration in the second position.

4. The adjustable profile member assembly according to claim 1, further comprising a first occupant support and a second occupant support, wherein a portion of the second occupant support overlies a portion of the first occupant support.

5. The adjustable profile member assembly according to claim 1, wherein the actuating mechanism is an air compressor.

6. The adjustable profile member assembly according to claim 5, wherein the air compressor further comprises a dump valve.

7. The adjustable profile member assembly according to claim 1, wherein the first adjustable profile member comprises a pad, a pad support for supporting the pad, and a displacement member, wherein when the displacement member is displaced the pad is moved such that the first adjustable profile member is moved between the first position and the second position.

8. The adjustable profile member assembly according to claim 7, further comprising an actuator mechanism connected to the displacement member for actuating the displacement member and operatively connected to the actuating mechanism.

9. The adjustable profile member assembly according to claim 7, wherein the actuator mechanism is a cable.

10. The adjustable profile member assembly according to claim 1, further comprising an occupant support for supporting an occupant in between the first adjustable profile member and the second adjustable profile member.

11. The adjustable profile member assembly according to claim 10, wherein the occupant support is a lumbar support.

12. The adjustable profile member assembly according to claim 10, wherein the occupant support is an upper back support.

13. A configurable bench-type vehicle seat adjustable between at least a first configuration and a second configuration, the configurable bench-type vehicle seat comprising:
    a. a seat base;
    b. a seat bottom supported by the seal base;
    c. a seat back coupled to the seat base, the seat back adapted to pivot from a stowed position to a deployed position; and
    d. an adjustable profile member mounted within the seat bottom or the seat back, the adjustable profile member being adjustable between a first position and a second position wherein the adjustable profile member has a non-flat profile configuration in the first position while the adjustable profile member has a flat profile configuration in the second position, wherein the adjustable profile member is located at a fixed location between a first side of the configurable bench-type vehicle seat and a second side of the configurable bench-type vehicle seat such that when the adjustable profile member is in the non-flat profile configuration in the first position the configurable bench-type vehicle seat is partitioned into a first fraction and a second fraction such that the first fraction and the second fraction can be used separately.

14. The configurable vehicle seat according to claim 13, wherein the adjustable profile member is located centrally between the first side of the bench-type vehicle seat and the second side of the bench-type vehicle seat such that the first fraction and the second fraction is in the ratio of 50 to 50.

15. The configurable vehicle seat according to claim 13, wherein the adjustable profile member is located such that the first fraction and the second fraction is in the ratio of 40 to 60.

16. The configurable vehicle seat according to claim 13, wherein the seat back further comprises an additional adjustable profile member, the additional adjustable profile member being adjustable between a first position and a second position wherein the additional adjustable profile member has a non-flat profile configuration in the first position while the additional adjustable profile member has a flat profile configuration in the second position.

17. The configurable vehicle seat according to claim 13, wherein the adjustable profile member comprises a pad, a pad support for supporting the pad, and a displacement member, wherein when the displacement member is displaced the pad is moved such that the first adjustable profile member is moved between the first position and the second position.

18. The configurable vehicle seat according to claim 13, wherein the adjustable profile member includes an air bladder.

19. The configurable vehicle seat according to claim 13, further comprising an actuating mechanism operatively connected to the adjustable profile member such that the adjustable profile member can be adjusted between the first position and the second position, and a master activation mechanism electrically connected to the actuating mechanism wherein through the use of the master activation mechanism a user can adjust the configurable bench-type vehicle seat between the first configuration wherein the adjustable profile member is in the first position and the second configuration wherein the adjustable profile member is in the second position.

20. The configurable vehicle seat according to claim 19, wherein the actuating mechanism is an air compressor.

21. The configurable vehicle seat according to claim 13, wherein the seat back further comprises an occupant support.

22. The configurable vehicle seat according to claim 13, further comprising a headrest operatively connected to the seat back.

23. The configurable vehicle seat according to claim 22, wherein the headrest includes an additional adjustable profile member, the additional adjustable profile member being adjustable between a first position and a second position wherein the additional adjustable profile member has a non-flat profile configuration in the first position while the additional adjustable profile member has a flat profile configuration in the second position.

24. The adjustable profile member assembly according to claim 1, wherein the first adjustable profile member is located centrally between the first side of the bench-type vehicle seat and the second side of the bench-type vehicle seat such that the first fraction and the second fraction is in the ratio of 50 to 50.

25. The adjustable profile member assembly according to claim 1, wherein the first adjustable profile member is located such that the first fraction and the second fraction is in the ratio of 40 to 60.

* * * * *